United States Patent
Kurihara et al.

(10) Patent No.: US 8,251,565 B2
(45) Date of Patent: Aug. 28, 2012

(54) ILLUMINATION DEVICE AND DISPLAY DEVICE

(75) Inventors: Makoto Kurihara, Chiba (JP); Norihiro Dejima, Chiba (JP)

(73) Assignee: Seiko Instruments Inc. (JP)

( * ) Notice: Subject to any disclaimer, the term of this patent is extended or adjusted under 35 U.S.C. 154(b) by 275 days.

(21) Appl. No.: 12/589,918

(22) Filed: Oct. 30, 2009

(65) Prior Publication Data

US 2010/0124076 A1    May 20, 2010

(30) Foreign Application Priority Data

Oct. 31, 2008  (JP) .................................. 2008-280630

(51) Int. Cl.
*F21V 7/04* (2006.01)
(52) U.S. Cl. ........ 362/626; 362/615; 362/623; 362/625; 362/330; 362/339
(58) Field of Classification Search .................. 362/608, 362/615, 621, 623, 625, 626, 330, 339
See application file for complete search history.

(56) References Cited

U.S. PATENT DOCUMENTS

| 3,935,139 | A  | * | 1/1976 | Ashall ............................ 524/594 |
| 5,695,269 | A  | * | 12/1997 | Lippmann et al. .............. 362/27 |
| 5,718,497 | A  | * | 2/1998 | Yokoyama et al. ............ 362/625 |
| 6,454,452 | B1 | * | 9/2002 | Sasagawa et al. ............. 362/561 |
| 6,671,013 | B1 | * | 12/2003 | Ohkawa ........................... 349/62 |
| 6,700,634 | B2 | * | 3/2004 | Taniguchi et al. .............. 349/65 |
| 6,851,815 | B2 | * | 2/2005 | Lee ................................. 362/23 |
| 6,979,112 | B2 | * | 12/2005 | Yu et al. ........................ 362/600 |
| 2007/0127268 | A1 | * | 6/2007 | Chen ............................. 362/630 |

* cited by examiner

*Primary Examiner* — Ismael Negron
*Assistant Examiner* — Tsion Tumebo
(74) *Attorney, Agent, or Firm* — Adams & Wilks

(57) ABSTRACT

A display device has at least one light source for emitting light and a light guide plate having a first surface for inputting light emitted from the at least one light source, a second surface for outputting illumination light, and a third surface opposite to the second surface. A display element having dots for displaying image information is arranged over the second surface of the light guide plate for receiving the illumination light. At least two microprisms are arranged on the third surface of the light guide plate in areas overlapping the dots of the display element. Each microprism has a height in the range of from 1 μm to 10 μm and a mirror surface for reflecting light emitted from the at least one light source. Each mirror surface has a base disposed perpendicular to a light path of the light emitted from the at least one light source.

20 Claims, 3 Drawing Sheets

ILLUMINATION DEVICE AND DISPLAY DEVICE

BACKGROUND OF THE INVENTION

1. Field of the Invention

The present invention relates to a display device used in a portable information device such as a cellular phone or a mobile computer.

2. Description of the Related Art

Conventionally, a liquid crystal display device that is small and thin and consumes less power is often used as a color image display device used in a portable information device such as a cellular phone or a mobile computer.

The liquid crystal display device includes a backlight as an illumination device. One known type of backlight is an edge-lit illumination device in which light from a light source enters on a side surface of a light guide plate and output from a top surface (hereinafter, referred to as exit surface) of the light guide plate. The light source includes a point light source such as a cathode ray tube or a light emitting diode (LED). The light guide plate has a surface (hereinafter, referred to as opposing surface) opposite to the exit surface, and a number of grooves and dot patterns are formed on the opposing surface. Further, the exit surface often includes a diffusing pattern formed thereon, which has an effect of diffusing light. An incident surface (that is, a surface which faces the light source and on which the light from the light source enters) of the light guide plate includes a prism formed thereon. The backlight with the above-mentioned structure has a function of outputting surface light because the light from the point light source is diffused by the prism. A material for the light guide plate may include a transparent resin such as polycarbonate (PC) or acryl (PMMA), which has a higher refractive index than air. In addition, a structure is predominantly adopted, in which a diffusing sheet or a prism sheet is provided on the exit surface side of the light guide plate. Further, a reflecting sheet is provided below the light guide plate.

There has also been developed a light guide plate that is specific to a point light source such as an LED and uses a microprism array so as to function without a prism sheet (see, for example, JP 2007-280952 A (FIG. 6)).

The conventional backlight structure uses the prism sheet and hence has limits in thickness, luminance efficiency, and cost. In the case of the microprism array backlight proposed in JP 2007-280952 A, the pyramidal diffusing patterns are basically oriented in the same direction, and hence the light from the point light source is not fully exploited. With the conventional backlight structure, the luminance efficiency is at substantially the same level as the case where the prism sheet is employed. Moreover, utilization efficiency of the light from the light source of the backlight is very low.

In addition, the conventional microprism array backlight is only adapted to a single point light source, and it has been impossible to increase the number of the light sources to two or more.

Further, the structure without the prism sheet has a problem in that moiré (interference) is likely to occur when a liquid crystal panel is placed thereon.

SUMMARY OF THE INVENTION

The present invention provides a display device including an illumination device and a display element, the illumination device including a light source and a light guide plate, the light guide plate having an incident surface on which light from the light source enters, an exit surface from which illumination light is output, and an opposing surface opposite to the exit surface, the display element being placed above the exit surface of the illumination device. In addition, the opposing surface of the light guide plate includes at least two pyramidal microprisms formed thereon in an area overlapping an opening of a liquid crystal panel. Further, the incident surface includes an entrance portion provided thereon, which is a semicircular depressed portion. An arrangement angle of the microprisms is optimized so that light from the entrance portion may be output with high efficiency.

With this structure, an illumination device that utilizes light from a light source in a highly efficient manner and that is inexpensive and thin may be realized. When the illumination device is combined with the liquid crystal panel, a display device that does not generate moiré may be realized. Further, the illumination device may be adapted to a plurality of light sources.

DETAILED DESCRIPTION OF THE PREFERRED EMBODIMENTS

Figure 1:
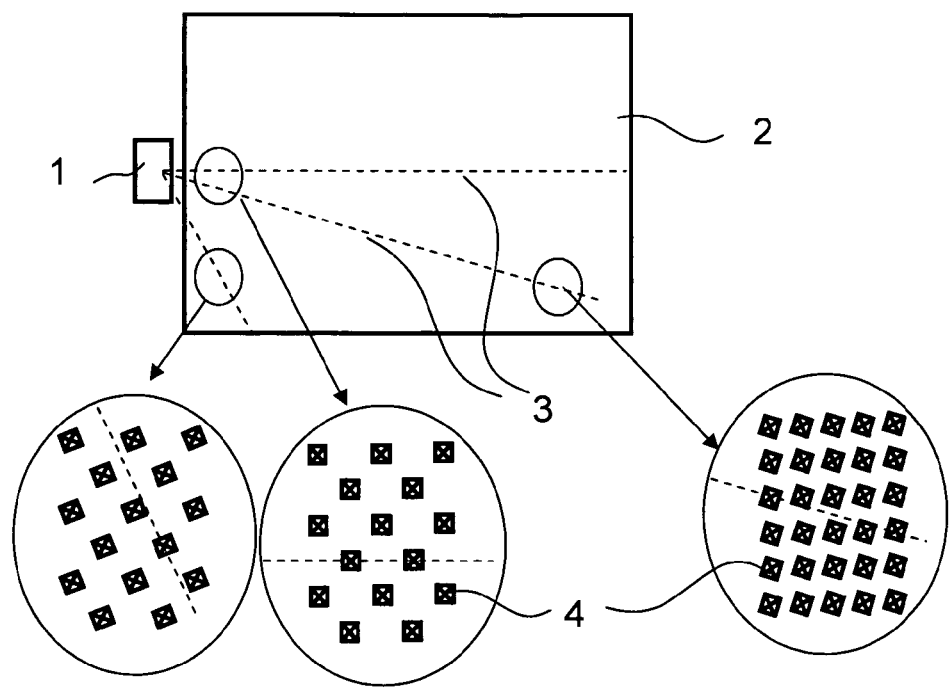
FIG. 1 is a front view schematically illustrating a structure of an illumination device according to the present invention.

The illumination device according to the present invention includes the light guide plate having the exit surface and the opposing surface opposite to the exit surface. The opposing surface includes a plurality of square pyramidal microprisms formed thereon for reflecting light from a point light source to output light upward from the exit surface. Each of the microprisms has a mirror surface for reflecting the light from the light source. Further, when a line connecting the light source and each of the microprisms is a light path, each of the microprisms is arranged so that a base of the mirror surface thereof forms an angle of 90 degrees with respect to the light path. With this structure, when light enters the light guide plate from the light source, strikes the microprisms, and is output from the exit surface of the light guide plate, utilization efficiency of the light may be maximized. Each of the microprisms is formed on the opposing surface of the light guide plate in a depressed shape, and desirably has a height in a range of from 1 to 10 µm and a basic angle in a range of from 40 to 50 degrees.

In addition, longitudinal prisms may be formed on the exit surface of the light guide plate to be perpendicular to the incident surface, to thereby eliminate a bright line of the illumination device without a prism sheet. Alternatively, the exit surface may be abraded partially or across the entire surface by blasting or, the like, or a diffusing layer may be formed on the exit surface by printing or the like, to thereby obtain the effect of suppressing the bright line as with the longitudinal prisms.

Further, an entrance portion, which is a semicircular depressed portion, is provided on the incident surface to correspond to the light source, and each of the microprisms is arranged so that the base of the mirror surface thereof is perpendicular to the light path of the light from the entrance portion. With this arrangement, even when the light path of the light varies depending on the shape of the entrance portion, the mirror surface of each of the microprisms may be perpendicularly irradiated with the light from the light source. Therefore, the utilization efficiency of the light may be maximized.

Further, a plurality of the light sources are provided, and each microprism is arranged so that the mirror surface thereof is perpendicular to the light path from any one of the light sources.

The display device according to the present invention is placed above the exit surface of the above-mentioned illumination device, and includes a display element illuminated by the illumination device. Further, in the display device of the present invention, when regions that transmit illumination light are openings of the display element, the microprisms are arranged with pitches that are equivalent to, or ⅓ or less of pitches of the openings of the display element. By thus arranging the pitches in matrix, it is possible to eliminate differences in number of microprisms corresponding to each of the openings of the display element, that is, each dot pitch of the liquid crystal panel. Therefore, luminance differences among dots of the liquid crystal panel may be resolved, and moiré or interference fringes may be prevented.

Hereinafter, a display device according to the present invention is described in detail with reference to the drawings.

EXAMPLE 1

A display device of Example 1 is described with reference to FIGS. 1 to 5.

FIG. 1 schematically illustrates a front structure of an illumination device of Example 1. In Example 1, a white light emitting diode (LED) package is used as a light source 1 of a backlight. The white LED package is of a type in which a blue LED is potted in a yellow fluorescent material. A light guide plate 2 is placed in front of the light source 1 and guides light emitted from the light source 1. In Example 1, the light source 1 is a point light source, and a white LED of a side view type is given as an example. However, the light source 1 may also be a white LED of a top view type or round lamp type, or an LED of a color other than white. The light guide plate 2 is a molded component formed of a transparent resin such as ZEONOR, polymethylmethacrylate (PMMA), or polycarbonate (PC). Light from the light source 1 propagates inside the transparent light guide plate 2, and is radiated to a display element from an exit surface (second surface), which is a top surface of the light guide plate 2. The light source 1 is placed to face an incident surface (first surface) of the light guide plate 2.

Countless microprisms 4 are arranged on an opposing surface (third surface) side opposite to the exit surface of the light guide plate 2. Each of the microprisms 4 has a pyramidal shape of a square pyramid and a mirror surface for reflecting the light from the light source 1. In examples of the present invention, of four side surfaces of the square pyramid, a surface for reflecting the light from the light source 1 is the mirror surface. Each of the microprisms 4 is arranged so that an orientation of the mirror surface is different from place to place when viewed from front. When a line connecting the light source 1 and each of the microprisms 4 is a light path 3, each of the microprisms 4 is arranged so that a base of the mirror surface thereof forms an angle of 90 degrees with respect to the light path 3. With this arrangement, it is possible to maximize utilization efficiency of the light that enters from the light source 1, strikes the microprisms 4, and is output from the exit surface of the light guide plate 2.

Figure 2A:
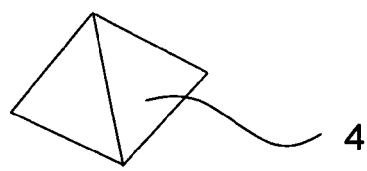
FIGS. 2a and 2b are perspective views schematically illustrating a microprism of the illumination device according to the present invention and a microprism of an illumination device according to a related art, respectively.
Figure 2B:
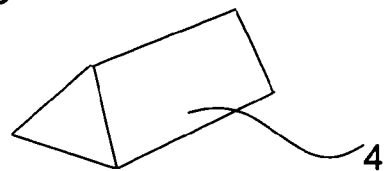

FIGS. 2a and 2b are perspective views illustrating structures of microprisms 4. FIG. 2a is a microprism 4 of the present invention. As illustrated in FIG. 2a, the microprism 4 is a square pyramid and has a height in a range of from about 1 to 10 μm. An angle formed by a bottom and a line connecting a base and a vertex is in a range of from about 40 to 60 degrees. FIG. 2b is a microprism as an example of a related art, which is a pentahedron having a rectangular bottom. The shape as in FIG. 2b is difficult to form in a small pattern. When the microprism is formed by injection molding, the smallest limit is about 1 μm. By employing the square pyramid shape as in FIG. 2a, a smaller pattern may be formed, to thereby increase the degree of freedom in design and facilitate taking moiré countermeasures to be described below.

Figure 3:
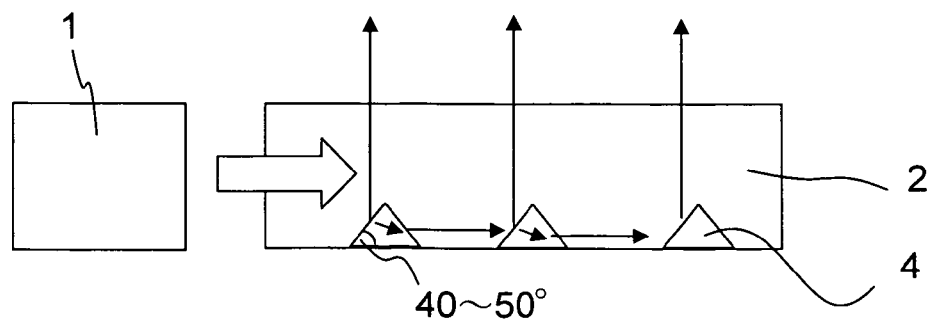
FIG. 3 is a cross-sectional view schematically illustrating the microprisms of the illumination device according to the present invention.

FIG. 3 is a cross-sectional view of the illumination device of Example 1. The light from the light source 1 enters the light guide plate 2, strikes the mirror surface of the microprism 4, and is output from the exit surface. The microprism 4 is formed in a depressed pattern on the opposing surface of the light guide plate 2. The light that strikes the microprism 4 is not entirely reflected on the mirror surface to be output from the exit surface. A part of the light is transmitted through the microprism 4, strikes a surface opposing the mirror surface, and again enters the light guide plate 2 while being refracted. In this case, an angle formed by the bottom and the surface opposing the mirror surface is preferably equal to an angle formed by the mirror surface and the bottom. In Example 1, the microprism is a square pyramid. Therefore, the angle formed by the mirror surface and the bottom, and the angle formed by the bottom and the surface opposing the mirror surface are equal, that is, about 45 degrees.

Figure 4:
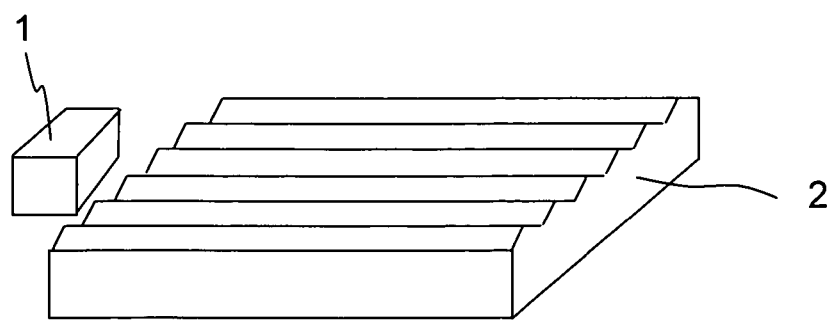
FIG. 4 is a perspective view schematically illustrating the structure of the illumination device according to the present invention.

FIG. 4 schematically illustrates a perspective structure of the illumination device of Example 1. The light enters the light guide plate 2 from the light source 1, propagates inside the light guide plate 2, and is reflected by the mirror surface of the above-mentioned microprism 4 to be output. The exit surface includes a plurality of longitudinal prisms formed thereon in parallel with a longitudinal direction of the light guide plate 2. The longitudinal prisms are formed perpendicular to the incident surface of the light guide plate 2. A vertical angle of each of the longitudinal prisms is in a range of from about 120 to 170 degrees. Pitches between the longitudinal prisms are preferably as small as possible in order to prevent moiré, but are limited to a range of about 15 to 100 μm due to the manufacturing process. With a backlight having a structure without a prism sheet as in the present invention, a phenomenon called bright line is prone to occur, which may be seen from any angle as a line from the light source 1. By providing the longitudinal prisms, the occurrence of the bright line may be suppressed. Alternatively, instead of the longitudinal prisms, the exit surface may be abraded partially or across the entire surface by blasting or the like, or a diffusing layer may be formed on the exit surface by printing or the like, to thereby obtain the effect of suppressing the bright line as with the longitudinal prisms.

Figure 5:
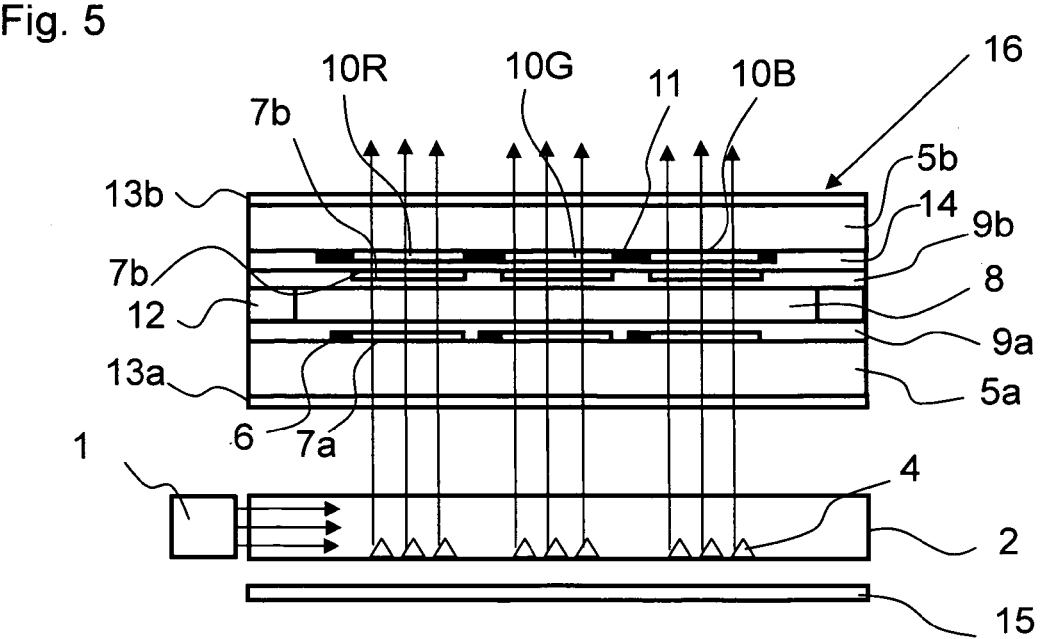
FIG. 5 is a cross-sectional view schematically illustrating a structure of a display device according to the present invention.

FIG. 5 schematically illustrates a cross-sectional structure of a display device of Example 1. As illustrated in FIG. 5, a liquid crystal panel 16 has a structure in which a liquid crystal layer 8 is sealed in a gap between a glass substrate 5a and an opposing substrate 5b. The glass substrate 5a includes lower indium tin oxides (ITOs) 7a and thin film transistor (TFT) areas 6 formed thereon. A lower orientation film 9a is further formed on the lower ITOs 7a and the TFT areas 6. On the other hand, the opposing substrate 5b, which is opposed to the glass substrate 5a, includes a red color filter 10R, a green color filter 10G, and a blue color filter 19B formed thereon. Black matrices 11 are formed in gaps among the color filter layers. Regions in which the red color filter 10R, the green color filter 10G, the blue color filter 10B, and the black matrices 11 are formed are planarized by a planarization layer 14. Provided on the planarization layer 14 are upper ITOs 7b forming pixel electrodes to be opposed to the lower ITOs 7a. An upper orientation film 9b is similarly formed on the upper ITOs 7b. The glass substrate 5a and the opposing substrate 5b having the above-mentioned surface structures are bonded to each other with a predetermined gap through intermediation of spacers 12 so that the surfaces having the films formed thereon face each other. Though not illustrated, in order to form the gap, beads of predetermined particle sizes are often dispersed inside the spacers and between the substrates. The liquid crystal layer 8 is sealed in the gap between the substrates. Initial orientation of liquid crystal molecules of the liquid crystal layer 8 is restricted by the lower orientation film 9a and the upper orientation film 9b. A lower polarizing plate 13a is placed on the glass substrate 5a, and an upper polarizing plate 13b is placed on the opposing substrate 5b. A pixel region of the liquid crystal panel 16 includes effective display regions and ineffective display regions. The ineffective display regions overlap the black matrices 11 and the TFT areas 6. In the present invention, the effective display regions are openings. Note that each of the openings corresponds to each dot on the liquid crystal panel 16.

Each opening is illuminated by the light emitted from the light source 1 and reflected by the microprisms 4. Therefore, when there is a difference in number of microprisms corresponding to each of the openings, a luminance difference is generated among dots of the liquid crystal panel. The luminance difference is generated also because a pitch of the openings (dot pitch of the liquid crystal panel) and an arrangement pitch between adjacent microprisms 4 on the light guide plate 2 are different. When the luminance difference is significant, a phenomenon called moiré or interference fringe occurs. Therefore, the numbers of microprisms corresponding to each of the openings are desirably equal. Further, a center pitch of adjacent microprisms 4 may be exactly the same as the dot pitch of the liquid crystal panel 16, or ⅓ or lower of the dot pitch of the liquid crystal panel 16. By thus arranging the pitches in matrix, it is possible to suppress the luminance difference among dots of the liquid crystal panel and to prevent occurrence of the moiré.

Further, a reflection sheet 15 is provided behind the light guide plate 2.

Further, a light diffusing sheet may be provided between the light guide plate and the liquid crystal panel. The light diffusing sheet has a surface on which fine projection and depression shapes are formed or beads are applied, and has a property of diffusing light by the surface.

EXAMPLE 2

Figure 6A:
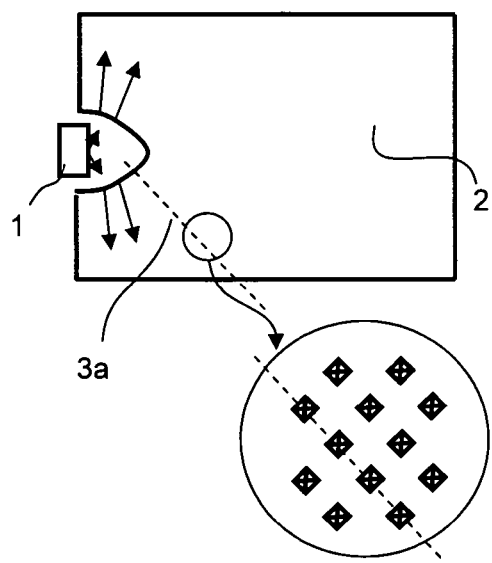
FIGS. 6a and 6b are front views each schematically illustrating a structure of the illumination device according to the present invention.
Figure 6B:
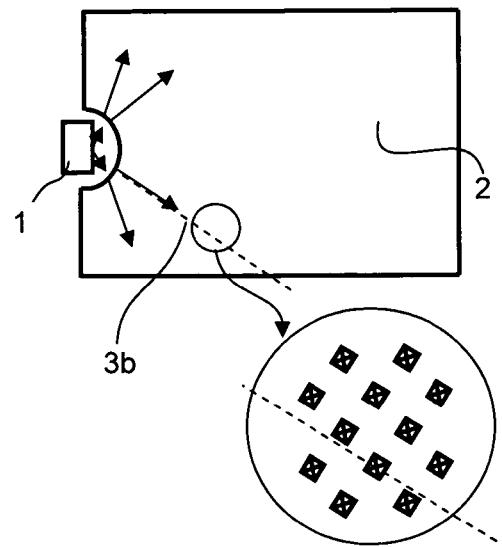

FIGS. 6a and 6b are front views each schematically illustrating a light guide plate 2 of Example 2. The light guide plates 2 of Example 2 are different from the light guide plate 2 of Example 1 in the shape of the entrance portion of the light guide plate 2. A semicircular depressed portion is provided to the incident surface of the light guide plate 2 to correspond to the light source 1, and functions as the entrance portion. When the entrance portion is a semicircular depressed portion as in Example 2, the light from the light source 1 is refracted by the semicircular entrance portion and then enters the light guide plate 2. Therefore, the light path is different from that of Example 1. Accordingly, optimum arrangement of the microprisms 4 is different from that of Example 1.

The entrance portion of FIG. 6a has a shape of a semicircle with a sharp tip, and the entrance portion of FIG. 6b has a shape of a semicircle with a blunt tip. A light path 3a and a light path 3b are each a line extending perpendicularly from the entrance portion. FIG. 6a and FIG. 6b are different in the semicircular shape of the entrance portion and in the refractive index for the light, and hence the light path 3a and the light path 3b have different light directions. The light guide plates 2 of FIG. 6a and FIG. 6b include the microprisms 4 in the same arrangement. When compared with FIG. 6b, the light from the light source 1 strikes the mirror surfaces of a larger number of microprisms 4 in FIG. 6a. The direction of the light from the light source varies depending on the shape of the entrance portion as described above. Therefore, the arrangement of the microprisms 4 on the light guide plate 2 needs to be changed so that the light from the light source 1 strikes the mirror surfaces of the microprisms 4. When each of the microprisms 4 is arranged so that a base of the mirror surface thereof is at 90 degrees with respect to the light path 3a in the case of FIG. 6a or the light path 3b in the case of FIG. 6b, the utilization efficiency of the light may be maximized. Specifically, with the semicircular entrance portion as in Example 2, when a line extending perpendicularly from the semicircle of the entrance portion is a light path, each of the microprisms 4 is arranged so that the base of the mirror surface thereof is at about 90 degrees with respect to the light path.

EXAMPLE 3

Figure 7:
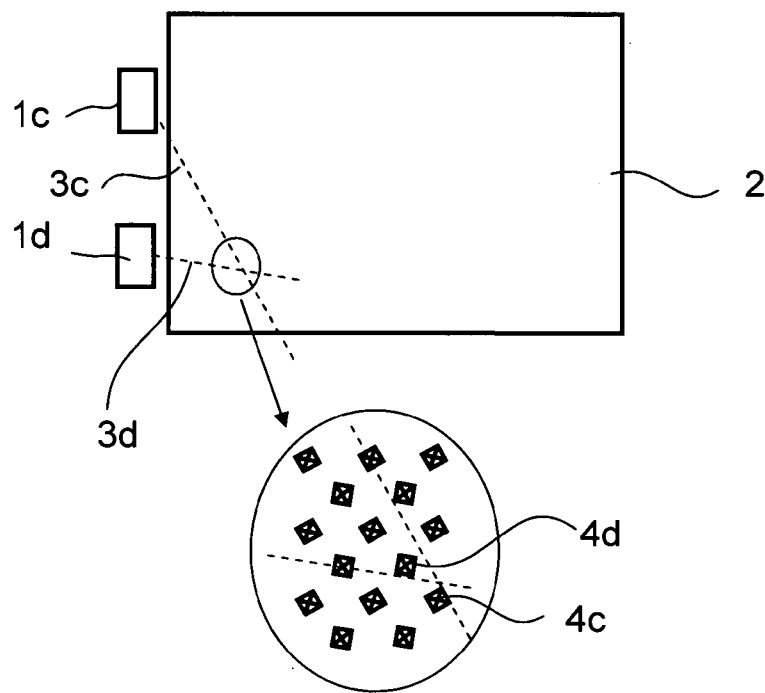
FIG. 7 is a front view schematically illustrating a structure of the illumination device according to the present invention.

FIG. 7 is a front view schematically illustrating a light guide plate 2 of Example 3. The light guide plate 2 of Example 3 is different from the light guide plates 2 of Examples 1 and 2 in the number of light sources 1 and an arrangement method of the microprisms 4. In Example 3, a light source 1c and a light source 1d are provided with respect to the incident surface of the light guide plate 2. Microprisms 4c and microprisms 4d are arranged on the light guide plate 2. The microprisms 4c and the microprisms 4d respectively correspond to the light source 1c and the light source 1d. The microprisms 4c and the microprisms 4d are alternately arranged. Each of the microprisms 4c is arranged so that a base of a mirror surface thereof is at about 90 degrees with respect to a light path 3c connecting the light source 1c and each of the microprisms 4c. Similarly, each of the microprisms 4d is arranged so that a base of a mirror surface thereof is at about 90 degrees with respect to a light path 3d connecting the light source 1d and each of the microprisms 4d. By thus arranging the microprisms, the utilization efficiency of light from the light sources may be maximized. In Example 3, the number of the light sources is 2, but even in a case where the number is 3 or more, when microprisms corresponding to the respective light sources are arranged so that bases of mirror surfaces thereof are at about 90 degrees with respect to light paths, a function similar to Example 3 is realized.

What is claimed is:

1. A display device, comprising:
    at least one light source;
    a light guide plate having an incident surface for inputting light from the at least one light source, an exit surface for outputting illumination light, and an opposing surface opposed to the exit surface;
    a plurality of square pyramidal microprisms each having a mirror surface for reflecting the light from the at least one light source, each of the plurality of square pyramidal microprisms having a height in the range of from 1 µm to 10 µm and being formed on the opposing surface of the light guide plate so that the mirror surface intersects with a base surface of the square pyramidal microprism at an angle in the range of from 40 to 50 degrees, and each of the plurality of square pyramidal microprisms being arranged so that a base of a mirror surface thereof is perpendicular to a light path of the light from the at least one light source; and
    a display element disposed above the exit surface of the light guide plate and having dots for displaying image information, at least two of the plurality of square pyramidal microprisms being formed in an area corresponding to each of the dots of the display element.

2. A display device according to claim 1; wherein the plurality of square pyramidal microprisms have a center pitch that is one of equal to and ⅓ or less of a pitch of the dots of the display element.

3. A display device according to claim 1; wherein the number of the square pyramidal microprisms corresponding to each of the dots of the display element is equal to one another.

4. A display device according to claim 1; wherein each of the plurality of square pyramidal microprisms is formed in a depressed shape on the opposing surface of the light guide plate.

5. A display device according to claim 1; wherein the incident surface of the light guide plate comprises a semicircular depressed entrance portion for inputting the light from the at least one light source.

6. A display device according to claim 1; wherein the at least one light source comprises a plurality of light sources; and wherein each of the plurality of square pyramidal microprisms is arranged so that the base of the mirror surface thereof is perpendicular to a light path of light from any one of the plurality of light sources.

7. A display device comprising:
    at least one light source for emitting light;
    a light guide plate having a first surface for inputting light emitted from the at least one light source, a second surface for outputting illumination light, and a third surface opposite to the second surface;
    a display element arranged over the second surface of the light guide plate for receiving the illumination light output from the second surface of the light guide plate, the display element having dots for displaying image information; and
    at least two microprisms each having a height in the range of from 1 µm to 10 µm and being arranged on the third surface of the light guide plate in areas overlapping the dots of the display element, each of the at least two microprisms having a mirror surface for reflecting light emitted from the at least one light source and input from the first surface of the light guide plate, each mirror surface having a base disposed perpendicular to a light path of the light emitted from the at least one light source.

8. A display device according to claim 7; wherein each of the at least two microprisms has a square pyramidal shape.

9. A display device according to claim 7; wherein the mirror surface of each of the at least two microprisms intersects with a base surface of the microprism at an angle in the range of from 40 to 50 degrees.

10. A display device according to claim 9; wherein each of the at least two microprisms has a square pyramidal shape.

11. A display device according to claim 7; wherein the at least two microprisms have a center pitch that is one of equal to and ⅓ or less of a pitch of the dots of the display element.

12. A display device according to claim 7; wherein each of the at least two microprisms is formed in a depressed shape on the third surface of the light guide plate.

13. A display device according to claim 12; wherein the mirror surface of each of the at least two microprisms intersects with a base surface of the microprism at an angle in the range of from 40 to 50 degrees.

14. A display device according to claim 12; wherein each of the at least two microprisms has a square pyramidal shape.

15. A display device according to claim 7; wherein the first surface of the light guide plate comprises a semicircular depressed entrance portion for inputting the light emitted from the at least one light source.

16. A display device according to claim 15; wherein the mirror surface of each of the at least two microprisms intersects with a base surface of the microprism at an angle in the range of from 40 to 50 degrees.

17. A display device according to claim 15; wherein each of the at least two microprisms has a square pyramidal shape.

18. A display device according to claim 7; wherein the at least one light source comprises a plurality of light sources; and wherein each of the at least two microprisms is arranged so that the base of the mirror surface thereof is perpendicular to a light path of light from any one of the plurality of light sources.

19. A display device according to claim 18; wherein the mirror surface of each of the at least two microprisms intersects with a base surface of the microprism at an angle in the range of from 40 to 50 degrees.

20. A display device according to claim 18; wherein each of the at least two microprisms has a square pyramidal shape.

* * * * *